United States Patent [19]

Sajben et al.

[11] 3,812,885
[45] May 28, 1974

[54] REINFORCED SYNTHETIC PLASTIC PIPE

[75] Inventors: Johannes Otto Sajben, Krefeld-Gartenstadt; Axel Lippert, Krefeld-Verbert; Klaus Stumpen, Cologne; Rainer Grünewald, Krefeld-Bockum, all of Germany

[73] Assignee: Bayer Aktiengesellschaft, Leverkusen, Germany

[22] Filed: Sept. 29, 1971

[21] Appl. No.: 184,844

[30] Foreign Application Priority Data
Oct. 15, 1970 Germany............................ 2050734

[52] U.S. Cl................................. 138/125, 138/178
[51] Int. Cl............................................. F16l 11/04
[58] Field of Search .......... 138/125, 124, 123, 144, 138/178

[56] References Cited
UNITED STATES PATENTS
2,862,524  12/1958  Smith.................................. 138/144
3,654,967  4/1972  Atwell et al. ....................... 138/144
2,862,524  12/1958  Smith.................................. 138/144

Primary Examiner—Houston S. Bell, Jr.
Assistant Examiner—Frederick R. Schmidt
Attorney, Agent, or Firm—Burgess, Dinklage & Sprung

[57] ABSTRACT

A fibre-reinforced synthetic plastic pipe, with at least one tubular endless knitted fibre fabric which is saturated by a duroplastic material, is produced by applying the duroplastic material to the surface of a core or internal liner whereby the core or internal liner is surrounded by a knitted head, which produces the knitted fabric which is placed into the layer of duroplastic material before this layer is hardened and the finished pipe is continuously drawn away.

8 Claims, 4 Drawing Figures

REINFORCED SYNTHETIC PLASTIC PIPE

The present invention relates to a fibre-reinforced synthetic plastic pipe and to a process and apparatus for continuously manufacturing such a synthetic plastic pipe.

Fibre-reinforced pipes made of synthetic plastics, some of which are lined for example with synthetic plastics or metal, have been manufactured for a relatively long time, preferably from duroplastic synthetic plastics such as unsaturated polyester reaction resins and epoxide reaction resins. Glass fibres in the form of rovings or strips which are thoroughly impregnated with the resin are usually employed as the reinforcing inserts.

Recently, other fibres such as carbon fibres, boron fibres, synthetic fibres based on polyamide and polyvinyl-chloride, etc., have been used to replace the glass fibres. Metal fibres having a fine count are also suitable.

It is generally known to produce glass fibre-reinforced pipes by the wrapping or winding method. The principle of this method consists in that rovings or strips of glass fibres are impregnated in an impregnating apparatus with reaction resin, the excess resin is stripped from the fibres by a stripper device, and the rovings or strips of fibres are then wound in layers or convolutions over a guideway onto a cylindrical mandrel which rotates about a horizontal axis. Hardening takes place thereafter.

Continuously operating winding installations exist wherein a continuously extruded liner pipe of polyvinyl chloride is completely covered with rovings in the longitudinal direction, which rovings are fixed by circumferential windings disposed closely adjacent to one another. To achieve this, impregnated strips are supported on spools which rotate about the polyvinyl chloride pipe as it is slowly moved in the axial direction.

According to another known continuous process, an endless steel strip is positively wound onto a mandrel-like support system. The peripheral surface of the support system consists of a plurality of special metal section members which are disposed side-by-side and arranged radially in relation to the axis, the members holding ball-mounted rollers at a spacing of a few centimetres throughout their length. The surface of the support system consequently consists of a plurality of rollers on which the wound or wrapped steel strip is able to slide in the circumferential direction and also, because of the positive winding, in the axial direction. The steel strip is drawn off at the self-supporting end and is once again positively wound on by the support system after a few diversions. By means of this mechanism, a rotating surface which is slowly moved forwards in the axial direction is obtained, the said surface continuously displacing axially the laminate which is wound thereon. The laminate then travels through a curving oven. The winding core terminates just before the end of the curing oven. The wound element is thereafter cut to the required lengths by means of a moving cutter arrangement.

These known processes are very involved and required relatively long production times. The pipes produced by these known processes have a low force-absorbing capacity in the axial direction, and are therefore susceptible to bending stresses.

The object of the present invention is to provide a fibre-reinforced synthetic plastic pipe and also a process and apparatus for the continuous production of this pipe, the pipe having good strength properties in the axial direction as well as in the radial direction. The process and apparatus according to the invention make the production of synthetic plastic pipes with such strength properties possible for the first time and running costs are also reduced in comparison with the prior processes.

The fibre-reinforced synthetic plastic pipe according to the invention, which may be provided with an internal liner, consists of a fibre reinforced duroplastic material, the fibre reinforcement comprising at least one tubular, endless knitted fabric which is saturated with duroplastic material.

According to one particular embodiment, the fibre reinforcement of the plastic pipe additionally comprises at least one circumferential wrapping layer of fibre material. This circumferential wrapping layer is likewise saturated by the duroplastic material.

Preferably, the duroplastic material comprises unsaturated polyester reaction resins or epoxide resins. The knitted reinforcing fabric is preferably made from glass, carbon, boron, metal, natural, synthetic or mixed fibres. The same fibre materials are suitable for the circumferential wrapping layer. The strength properties of the pipe can be varied, both circumferentially and longitudinally, by adjustment of the direction and number of meshes. The variation of the mesh density and mesh size permits the adjustment of the fibre content in the duroplast. Graduations in strength values can also be produced by using different types of fibres in one knitted fabric or in different layers.

If the fibres are electrically conductive, these reinforcing inserts can be advantageously used as electrical heating means if they are provided with current supply means. Electrically conducting reinforcing inserts can also be used with advantage for the discharge of electrostatic potentials. It is particularly suitable to use thermoplastic plastics, for example polyvinyl chloride, polypropylene, polyamide, etc. as an internal liner. Prefabricated metal pipes can also be employed as internal liners. Where thermoplastic internal liners are involved, these are preferably extruded immediately before the application of the duroplastic material and the introduction of the fibre reinforcement.

In accordance with the process of the invention for the continuous production of the synthetic plastic pipe, a mandrel or an internal liner is coated with a duroplastic material which is in a condition so that it is able to flow and a reinforcement is applied to the coating, this reinforcement being saturated by a duroplastic material. The duroplastic material is thereafter cured. The novel feature is to be seen in the fact that the fibre reinforcement is produced by knitting it around the mandrel or internal liner.

In this way, a fibre reinforcement is produced which has a coherent structure both circumferentially and longitudinally, and consequently guarantees particularly good strength properties for the finished pipe in both the radial and axial directions.

For the production of pipes capable of withstanding particularly high stresses, the invention preferably provides for several layers of duroplastic material and several layers of fibre material to be applied alternately. For increasing the radial strength, the process in accordance with one particular embodiment provides for at least one intermediate layer of fibre material to be applied in the form of rovings or strips in the circumferential winding procedure.

One factor which is particularly advantageous as regards technical procedure is that the impregnation of the knitted-on fibre reinforcement is caused by the compressive force produced during the knitting operation and withdrawal of the pipe.

For producing high strength properties, the knitted fabric is advantageously pretensioned by the withdrawal force acting on the pipe. The pretension is set during the curing operation.

For the manufacture of pipes having a certain internal coutour, for example, a round, polygonal or elliptical coutour, it is advantageous to use a mandrel or internal liner of a corresponding contour.

The mandrel or internal liner is preferably rotated, so that the supplied duroplastic material is stripped from the supply nozzle. So as to avoid an irregular covering, it has proved to be advantageous for the mandrel to be moved backwards and forwards axially.

The apparatus according to the invention for carrying out the process is characterised by a mandrel or internal liner which is concentrically arranged with a supply nozzle equipped with a duroplast feed pipe and a knitting head following the nozzle, following which a curing oven is arranged. The supply nozzle consists for example of a small storage vessel, the bottom of which is provided with a replaceable stripper nozzle which surrounds the mandrel or liner as it leaves a gap. Various types of knitting heads are obtainable on the market, such as those used for example for the manufacture of jersey materials. It is advantageous for several supply or applicator nozzles and knitting heads to be arranged alternately and in succession. When working with a mandrel, a curing oven is in this case to be provided behind the first knitting head, so that the first layer solidifies and can serve as a support for the additional layers. The duroplast applied to this support is finally cured at the end of the apparatus in a second curing oven.

It is in addition advantageous to provide at least one circumferential winding or wrapping device. The devices which are used with the known winding methods, with which for example rovings or fabric strips are supplied, are suitable for this purpose.

The mandrel is advantageously equipped with a rotational drive means. As an alternative to this, the knitting head is provided with a rotational drive means.

The apparatus is preferably arranged on a vehicle, so that pipes can be continuously produced immediately when they are laid in situ. In this way, exceptional saving in expense is obtained when long pipe conduits are laid.

However, it is obvious that the continuously manufactured length of pipe can be cut to suitable pipe lengths, especially with stationary installations. These pipe sections are if necessary provided with flanges.

The fibre-reinforced synthetic plastic pipe according to the invention and the relevant apparatus according to the invention are shown in diagrammatic form in the accompanying drawings and are hereinafter more fully explained.

Referring to the accompanying drawings.

Figure 1:
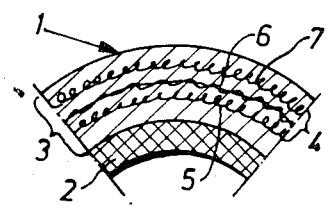
FIG. 1 is a partial cross-sectional view of a lined synthetic plastic pipe according to the present invention.

In FIG. 1, a fibre-reinforced synthetic plastic pipe 1 is shown which consists of an internal liner 2 on which a duroplast layer 3 is arranged. Embedded in this duroplast layer 3 is a fibre reinforcement 4. It is built up of an inner knitted fabric layer 5, a circumferential winding 6 consisting of rovings and an outer knitted fabric layer 7.

Figure 2:
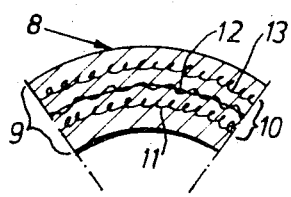
FIG. 2 is a partial cross-sectional view of an unlined synthetic plastic pipe according to the present invention.

In FIG. 2, a fibre-reinforced synthetic plastic pipe 8 is shown which consists of a duroplast layer 9 which is applied in several layers and in which is embedded a fibre reinforcement 10. This is built up of an inner knitted fabric layer 11, a circumferential winding or wrapping layer 12 and an outer knitted fabric layer 13.

Figure 3:
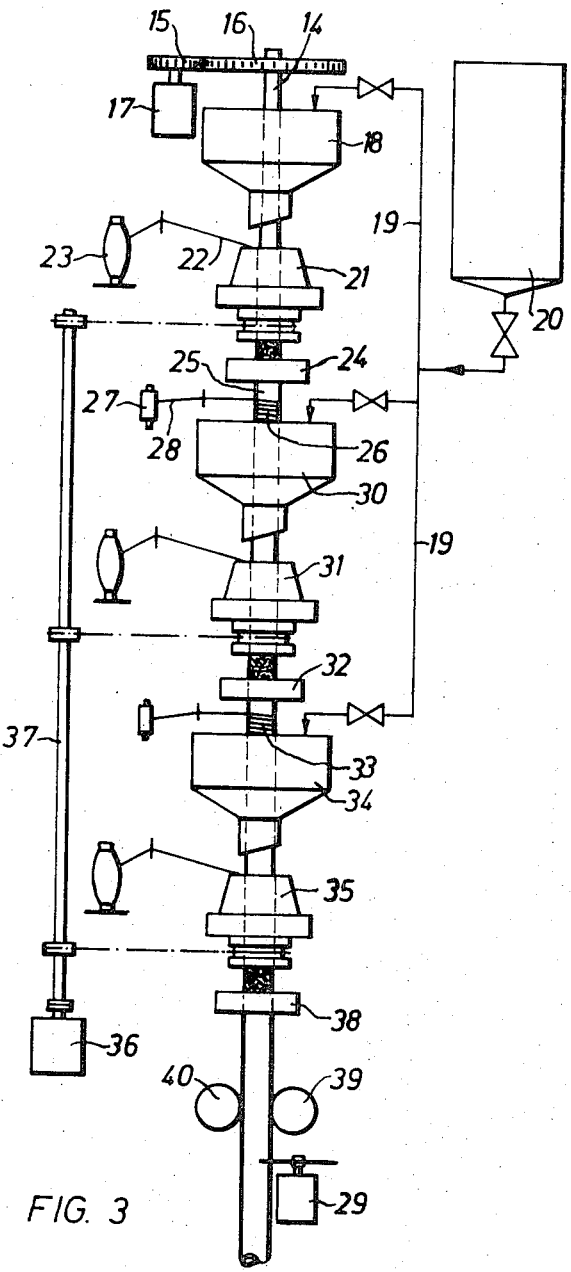
FIG. 3 shows in diagrammatic form a vertically disposed apparatus for the manufacture of synthetic plastic pipes.

FIG. 3 shows a mandrel 14, which is rotatable by a motor 17 through gears 15, 16. The mandrel 14 is surrounded by a supply nozzle 18 which is charged with duroplastic material from a storage vessel 20 through a supply pipe 19. Arranged below the supply or applicator nozzle 18 is a circular knitting head 21, to which glass fibre filaments 22 are supplied from a supply reel 23. Arranged below the circular knitting head 21 in the direction of motion of the pipe is a curing oven 24. When a synthetic plastic pipe 25 leaves the curing oven 24, a circumferential wrapping 26 is laid on it which consist of rovings 28 from a supply reel 27. The wrapping is effected by the rotation of the plastic pipe 25, which is set in rotation by a drive means 29. A second layer of duroplast material is applied from another applicator nozzle 30 which is charged with duroplastic material by the pipe 19. A second layer of knitted fabric is applied by a second circular knitting head and is saturated by duroplast which is then solidified in a curing oven 32. After the curing operation, another circumferential wrapping 33 is applied. A third applicator nozzle 34 provides for the supply of another layer of duroplastic material, onto which another layer of knitted fabric is laid by a third circular knitting head 35. The circular knitting heads 21, 31 and 35 are set in rotation by a common drive means 36 through a transmission shaft 37. The duroplastic layer applied last is set in a curing oven 38. The synthetic plastic pipe 25 is withdrawn by means of a pair of withdrawal rollers 39, 40.

Figure 4:
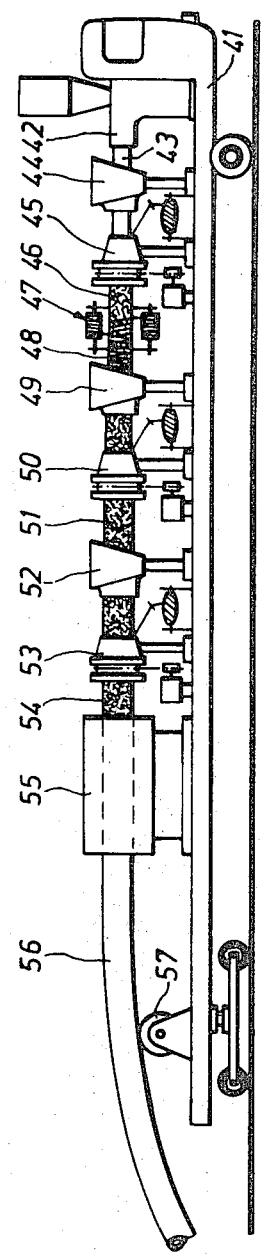
FIG. 4 shows in diagrammatic form an apparatus arranged horizontally on a vehicle for the manufactures and direct laying of plastic pipes.

In FIG. 4, the apparatus according to the invention is shown mounted on a vehicle 41. An internal liner 43 is extruded from an extruder 42, a duroplast being applied to the liner by a first applicator nozzle 44. A knitted fabric 46 is knitted around the internal liner 43 from a first circular knitting head 45 and thereafter a circumferential wrapping layer 48 is laid on by a wrapping device 47. Another layer of duroplastic material is applied from a second applicator nozzle 49 and then a second layer 51 of knitted material is applied from a second knitting head 50. Finally, more duroplastic material is laid on from a third applicator nozzle 52 and this is followed by a third layer 54 or knitted material provided by a circular knitting head 53. The duroplast is finally set in a curing oven 55. The finished synthetic plastic pipe 56 thereafter runs over a supporting roller 57 directly into the trench (not shown) prepared for the layer operation. The vehicle is moved forwards at the operating speed of the apparatus.

What we claim is:

1. A fiber reinforced synthetic plastic pipe, comprising a duroplastic material which is reinforced by at least one tubular, endless knitted fiber fabric which is impregnated with and embedded in the duroplastic material, and at least one circumferential wrapping layer of fiber material which is impregnated with and embedded in the duroplastic material, a layer of the duroplastic material being interposed between the knitted fabric and the circumferential wrapping layer.

2. Pipe according to claim 1, and an internal liner for the reinforced synthetic plastic.

3. Pipe according to claim 1, said knitted fabric being disposed radially inwardly of said circumferential wrapping layer.

4. Pipe according to claim 3, and an internal liner for the reinforced synthetic plastic.

5. Pipe according to claim 3, and a second reinforcing knitted fibre fabric impregnated with and embedded in duroplast material, disposed radially outwardly of the circumferential wrapping layer and a layer of the duroplastic material interposed between the circumferential wrapping layer and the second knitted fabric.

6. Pipe according to claim 5, and an internal liner for the reinforced synthetic plastic.

7. Pipe according to claim 1, at least two reinforcing knitted fibre fabrics impregnated with and embedded in the duroplastic material and at least two reinforcing circumferential wrapping layers of fiber material impregnated with and embedded in the duroplastic material, the knitted fibre fabrics and circumferential wrapping layers alternating over the cross-section of the pipe with the innermost reinforcement being a knitted fibre fabric and the outermost of said reinforcements being a circumferential wrapping layer, a layer of the duroplastic material being interposed between each of the succession of fiber reinforcements.

8. Pipe according to claim 7, and an internal liner for the reinforced synthetic plastic.

* * * * *